(12) United States Patent
Masui

(10) Patent No.: US 10,554,884 B2
(45) Date of Patent: Feb. 4, 2020

(54) IN-VEHICLE CAMERA CONTROL DEVICE

(71) Applicant: DENSO CORPORATION, Kariya, Aichi-pref. (JP)

(72) Inventor: Soji Masui, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 18 days.

(21) Appl. No.: 14/396,436

(22) PCT Filed: Mar. 4, 2013

(86) PCT No.: PCT/JP2013/055824
§ 371 (c)(1),
(2) Date: Oct. 23, 2014

(87) PCT Pub. No.: WO2013/161389
PCT Pub. Date: Oct. 31, 2013

(65) Prior Publication Data
US 2015/0138359 A1 May 21, 2015

(30) Foreign Application Priority Data
Apr. 26, 2012 (JP) ................. 2012-101577

(51) Int. Cl.
*H04N 5/232* (2006.01)
(52) U.S. Cl.
CPC ................ *H04N 5/23241* (2013.01)
(58) Field of Classification Search
None
See application file for complete search history.

(56) References Cited

U.S. PATENT DOCUMENTS

2003/0080713 A1\* 5/2003 Kirmuss ............... B60R 11/02
320/150
2006/0115120 A1\* 6/2006 Taniguchi ............... B60R 1/00
382/104
(Continued)

FOREIGN PATENT DOCUMENTS

| JP | 2001088609 A | 4/2001 |
| JP | 2006151301 A | 6/2006 |

(Continued)

OTHER PUBLICATIONS

Office Action dated Nov. 24, 2015 in corresponding Chinese Application No. 201380021951.0 with English translation.
(Continued)

*Primary Examiner* — William C Vaughn, Jr.
*Assistant Examiner* — Stuart D Bennett
(74) *Attorney, Agent, or Firm* — Harness, Dickey & Pierce, P.L.C.

(57) ABSTRACT

An in-vehicle camera control device is provided for an in-vehicle camera that includes an imaging element for picking up an image around the vehicle. The apparatus controls a state of current supply to the imaging element. In the apparatus, current supply to the imaging element is prevented from starting when the temperature in the vicinity of the imaging element is high.

Specifically, upon start of processing, current supply to the imaging element of the in-vehicle camera is stopped first (camera is powered OFF). Therefore, at least immediately after the ignition is turned on, current supply to the imaging element is not performed. When a state where a temperature measured by a temperature measurement section provided in the vicinity of the imaging element is not more than an ON
(Continued)

threshold continues for a duration expressed by Ams× (startup counter value), current supply to the imaging element is started.

5 Claims, 5 Drawing Sheets

(56) References Cited

U.S. PATENT DOCUMENTS

| | | | |
|---|---|---|---|
| 2006/0287821 A1* | 12/2006 | Lin | B60R 1/12 |
| | | | 701/469 |
| 2010/0060738 A1* | 3/2010 | Kataoka | G06K 9/209 |
| | | | 348/148 |
| 2012/0293657 A1 | 11/2012 | Kataoka et al. | |

FOREIGN PATENT DOCUMENTS

| | | | |
|---|---|---|---|
| JP | 2007-312139 | | 11/2007 |
| JP | 2007312139 A | * | 11/2007 |
| JP | 2009015929 A | | 1/2009 |
| JP | 2010064513 A | | 3/2010 |
| JP | 2010143387 A | | 7/2010 |
| JP | 2011122485 A | | 6/2011 |
| JP | 2012246795 A | | 12/2012 |

OTHER PUBLICATIONS

International Preliminary Report on Patentability dated Nov. 6, 2014 in corresponding PCT Application No. PCT/JP2013/055824.
International Search Report (in Japanese with English Translation) for PCT/JP2013/055824, dated May 21, 2013; ISA/JP.
Written Opinion for PCT/JP2013/055824, dated May 21, 2013; ISA/JP.

* cited by examiner

FIG.5

| CATEGORY | NAME OF CONSTANT | VALUE | PHYSICAL QUANTITY [REFERENCE VALUE] CORRESPONDING TO VALUE | | | | EXPLANATION |
|---|---|---|---|---|---|---|---|
| | | | min | typ | max | UNIT | |
| DETERMINATION INTERVAL | NORMAL STATE/ HIGH-TEMPERATURE STATE DETERMINATION INTERVAL | | — | B | — | ms | |
| | CAMERA POWER NORMAL STATE DETERMINATION INTERVAL | | | A | — | ms | |
| COMMONALITY | COUNT RESET THRESHOLD | P | — | | | — | THRESHOLD FOR RESETTING COUNT |
| POWER-ON OF CAMERA | CAMERA STARTUP COUNT THRESHOLD | M (STARTUP COUNTER VALUE) | A × M | | | ms | WHEN A CAMERA STARTUP COUNTER COUNT (A × α) BECOMES EQUAL TO A CAMERA STARTUP COUNTER COUNT THRESHOLD AFTER RELEASE OF RESETTING OF THE MICROCOMPUTER, CAMERA IS POWERED ON. |
| | CAMERA RETURN A/D VALUE | K | T1 | T2 | T3 | °C | WHEN A CAMERA RETURN COUNT (B × γ) BECOMES EQUAL TO A CAMERA RETURN COUNT THRESHOLD, CAMERA IS POWERED ON. |
| | CAMERA RETURN COUNT THRESHOLD | N (RETURN COUNTER VALUE) | B × N | | | ms | |
| POWER-OFF OF CAMERA | CAMERA CUTOFF A/D VALUE | J | T4 | T5 | T6 | °C | WHEN A CAMERA CUTOFF COUNT (B × β) BECOMES EQUAL TO A CAMERA CUTOFF COUNT THRESHOLD, CAMERA IS POWERED OFF. |
| | CAMERA CUTOFF COUNT THRESHOLD | L (CUTOFF COUNTER VALUE) | B × L | | | ms | |

IN-VEHICLE CAMERA CONTROL DEVICE

CROSS REFERENCE TO RELATED APPLICATIONS

This application is a U.S. National Phase Application under 35 U.S.C. 371 of International Application No. PCT/JP2013/055824 filed on Mar. 4, 2013 and published in Japanese as WO 2013/161389 A1 on Oct. 31, 2013. This application is based on and claims the benefit of priority from Japanese Patent Application No. 2012-101577 filed Apr. 26, 2012. The entire disclosures of all of the above applications are incorporated herein by reference.

BACKGROUND OF THE INVENTION

Field

The present invention relates to an in-vehicle camera control device for an in-vehicle camera including an imaging element to pick up an image around the vehicle, the device controlling at least a state of current supply to the imaging element, and more particularly to an in-vehicle camera control device that can control the state of current supply in accordance with the temperature in the vicinity of the imaging element.

Technical Background

Recently, there is an increasing trend of mounting an in-vehicle camera to a vehicle. Such an in-vehicle camera includes an imaging element to pick up an image around the vehicle. For vehicles mounting such an in-vehicle camera, various techniques are proposed as well to analyze an image picked up around the vehicle and reflect the analysis to the vehicle travel. However, the imaging element included in this sort of in-vehicle camera has a setting of a recommended temperature range to guarantee the operation. In an abnormally high temperature range, current supply to the imaging element is required to be stopped to protect the imaging element. In this regard, in one proposal, a temperature sensor is arranged in the vicinity of an imaging element to stop current supply to the imaging element when the temperature detected via the temperature sensor during image pickup performance has exceeded a threshold level (e.g., see PLT 1).

However, in the technique described in PLT 1, the output of the temperature sensor is not referred to at the start of the control, such as at power-on. Accordingly, current supply to the imaging element is performed regardless of whether the temperature is abnormally high around the imaging element, and this may lead to various inconveniences. For example, an imaging element, such as a CCD (charge-coupled device) or CMOS (complementary metal-oxide semiconductor) image sensor, is weak in high temperature. Accordingly, when current supply is performed for such an imaging element in a high temperature, the imaging element may be broken or noise may be generated. In particular, when the in-vehicle camera is arranged around the front window, the problem will be more serious because temperature tends to be high around the front windscreen.

Patent Literature 1 JP-A-2001-088609

SUMMARY

It is desired to provide an in-vehicle camera control device for an in-vehicle camera including an imaging element which picks up an image around the vehicle, the device controlling a state of current supply to the imaging element, and aims at preventing start of current supply to the imaging element when the temperature around the imaging element is high.

In an embodiment of the present invention, a current supply control means refers to a temperature in the vicinity of an imaging element, which has been measured by a temperature measuring means, prior to the start of current supply to the imaging element. When the temperature is not more than a preset first threshold, current supply to the imaging element is started. Thus, when temperature is high exceeding the first threshold in the vicinity of the imaging element, current supply to the imaging element can be prevented from starting to successfully protect the imaging element.

BRIEF DESCRIPTION OF THE DRAWINGS

In the accompanying drawings:

FIG. 5 is an explanatory diagram illustrating a relationship between parameters of the control.

DETAILED DESCRIPTION OF THE PREFERRED EMBODIMENTS

Configuration of an Embodiment

Figure 1:
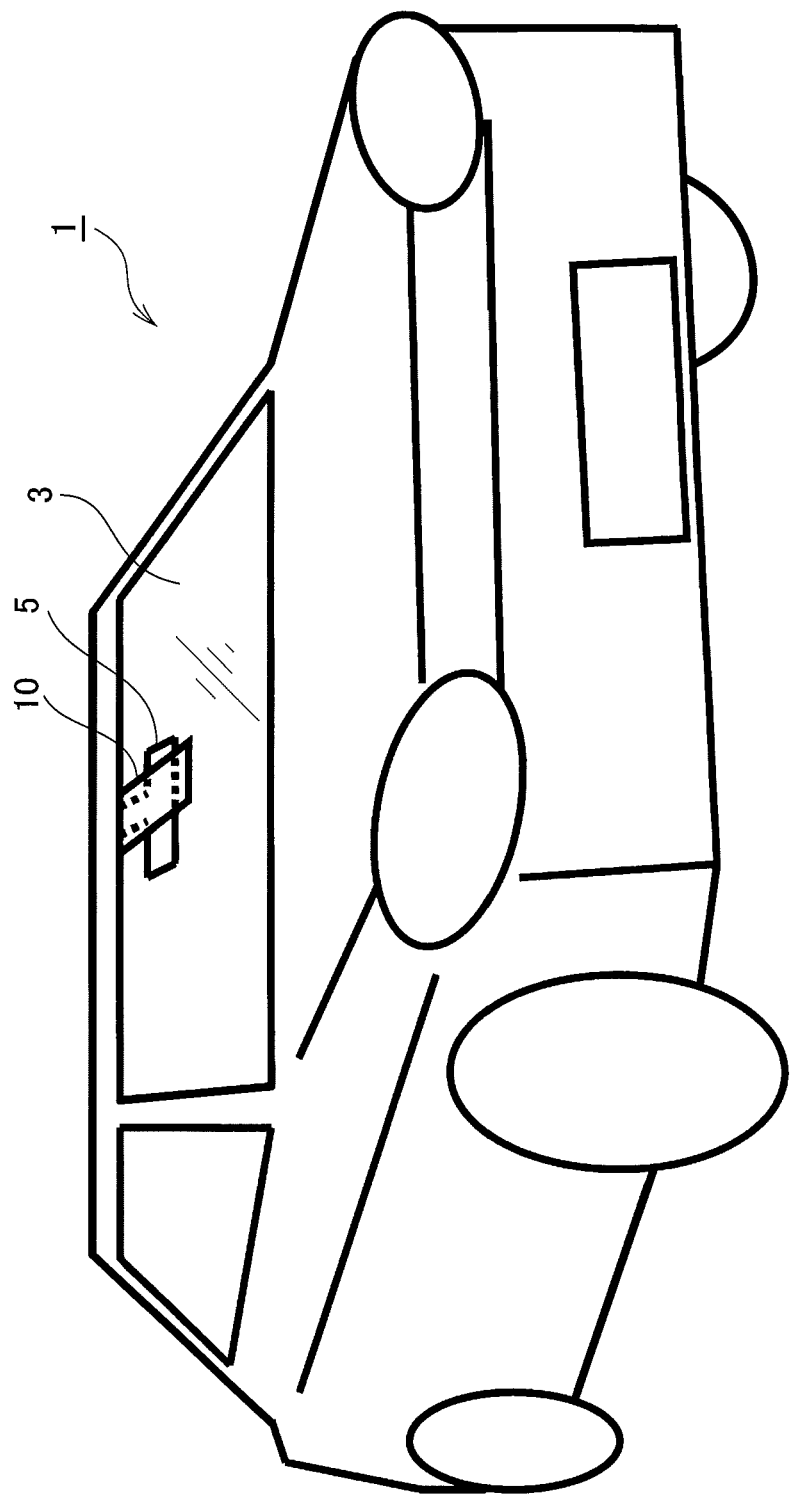
FIG. 1 is a perspective view schematically illustrating an arrangement of a camera unit to which the present invention is applied.

With reference to the drawings, hereinafter is described an embodiment to which the present invention is applied. As shown in FIG. 1, a camera unit 10 to which an in-vehicle camera control device of the present invention is applied is mounted to an upper center portion of a front window 3 of a vehicle 1 so as to be located at a position behind a rearview mirror 5, which is a position in the vicinity of the base of the rearview mirror. The camera unit 10 is used for vehicle controls, such as lane deviation warning control under which a warning is given when the vehicle has deviated from a lane on a road, control of automatic high beam under which a high beam is allowed to be emitted when there is no preceding vehicle, and control of collision avoidance under which braking is automatically applied when the vehicle has approached a preceding vehicle.

Figure 2:
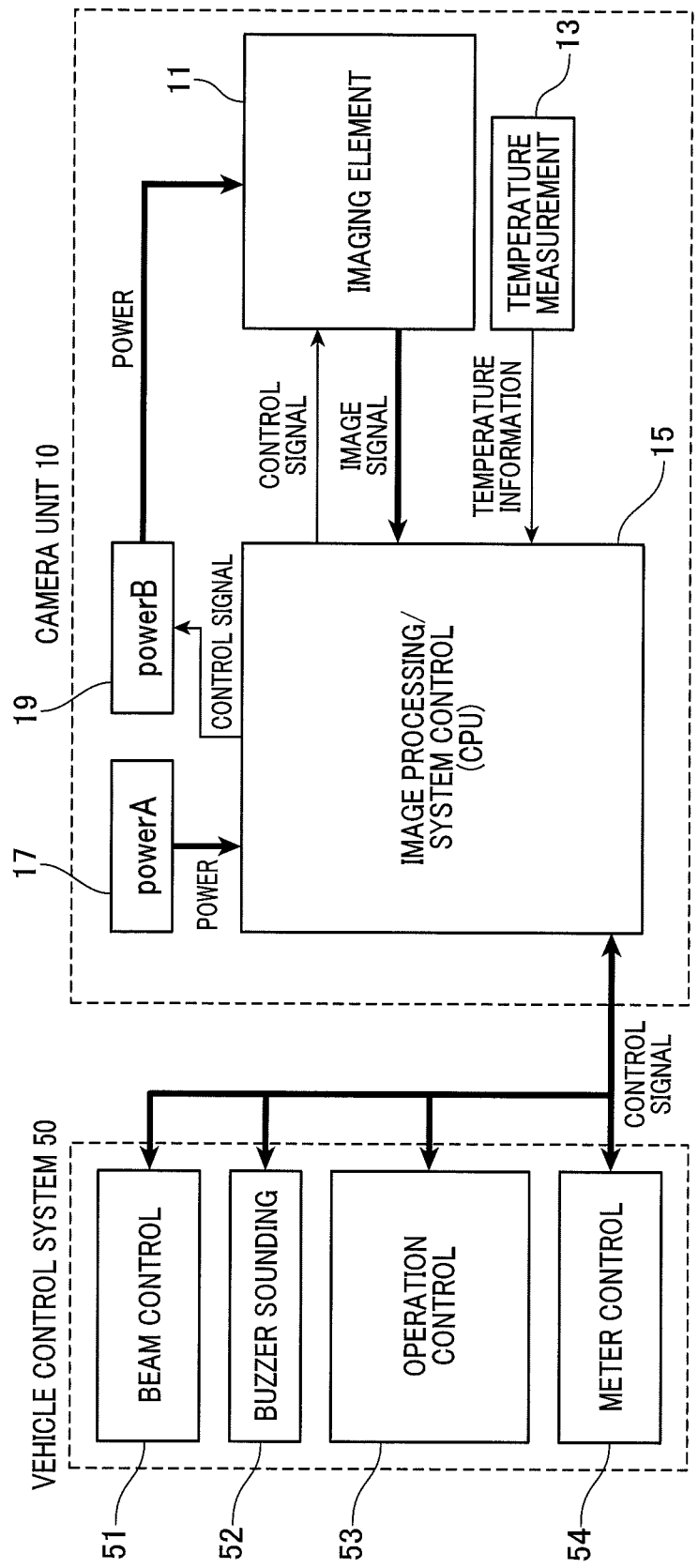
FIG. 2 is a block diagram illustrating a configuration of a control system of the camera unit.

The camera unit 10 includes a housing. In the housing, as shown in FIG. 2, there are incorporated not only an imaging element 11, such as CCD, but also an in-vehicle camera control device having the following configuration to control a state of current supply to the imaging element 11. Specifically, in the vicinity of the imaging element 11, a temperature measurement section 13 composed such as of a thermistor is provided. It should be noted that the "vicinity" may only have to be a spatial range in which the temperature changes in accordance with the temperature of the imaging element 11 (desirably, in one-to-one relation). Temperature information corresponding to a temperature measured by the temperature measurement section 13 is inputted to an image processing/system control section 15 including a microcomputer which is mainly composed of a CPU (central processing unit), together with an image signal corresponding to an image picked up by the imaging element 11. The image processing/system control section 15 processes an image picked up by the imaging element 11 and transmits a control signal based on the results of the image processing to a vehicle control system 50. The vehicle control system 50 includes, for example, a beam control section 51, a buzzer sounding section 52, an operation control section 53 and a meter control section 54, and is configured to execute the vehicle controls mentioned above on the basis of the image signal. The sections of the vehicle control system 50 are each transmitted with a control signal from the image processing/system control section 15. Further, the image processing/system control section 15 outputs a control signal to the imaging element 11 as well to control the operation.

The interior of the housing of the camera unit 10 is further provided with an A power source (power A) 17 and a B power source (power B) 19 each of which receives a supply of power such as from a battery of the vehicle 1 to output a power of a specified voltage. The A power source 17 supplies power for software processing to the image processing/system control section 15. The B power source 19 supplies power for performing image pickup to the imaging element 11. Thus, the image processing/system control section 15 performs the following process using the power supplied from the A power source 17 to thereby control the state of current supply from the B power source 19 to the imaging element 11.

Control in the Embodiment

Figure 3:
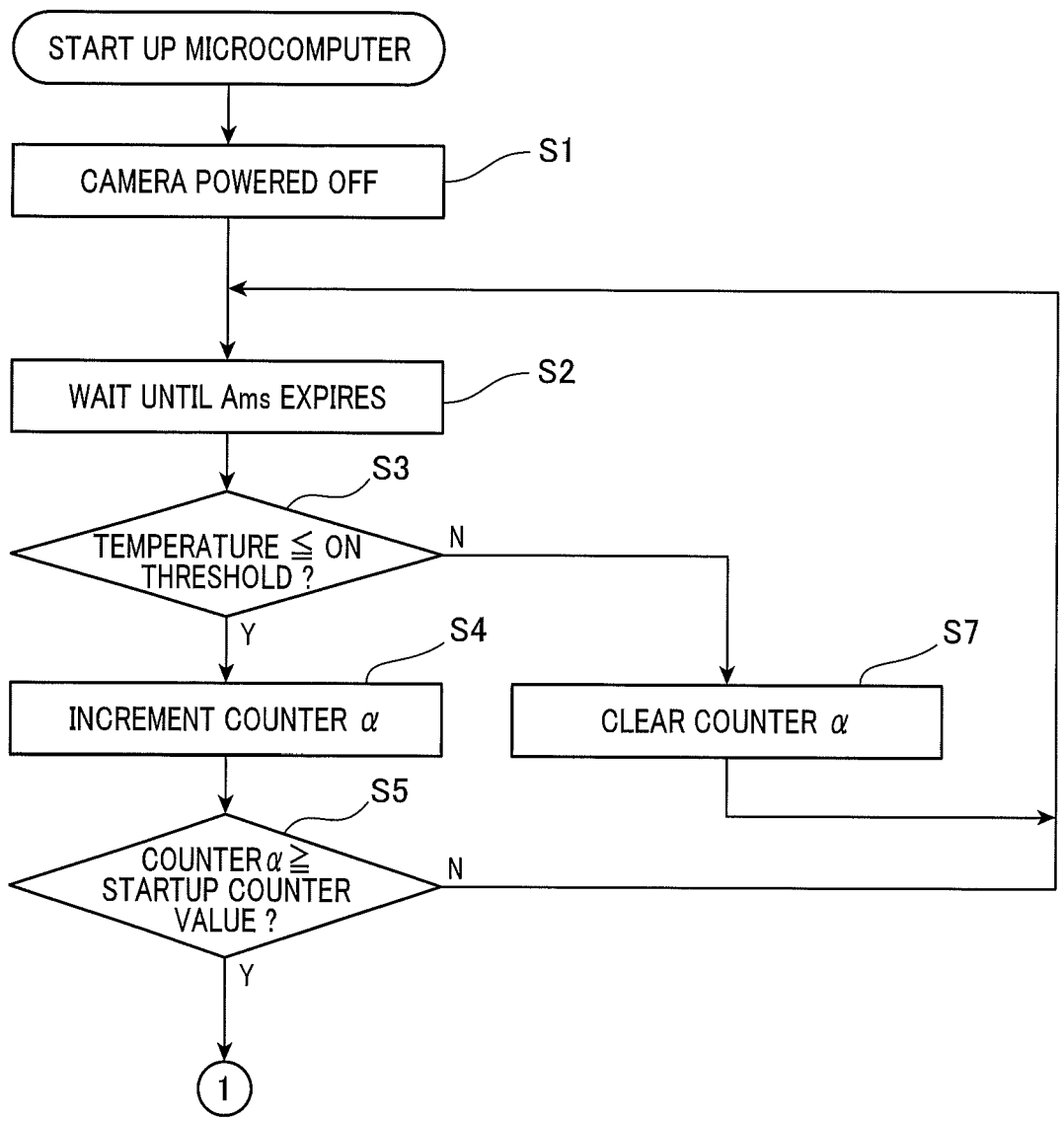
FIG. 3 is a flow chart illustrating a part of control in the control system.
Figure 4:
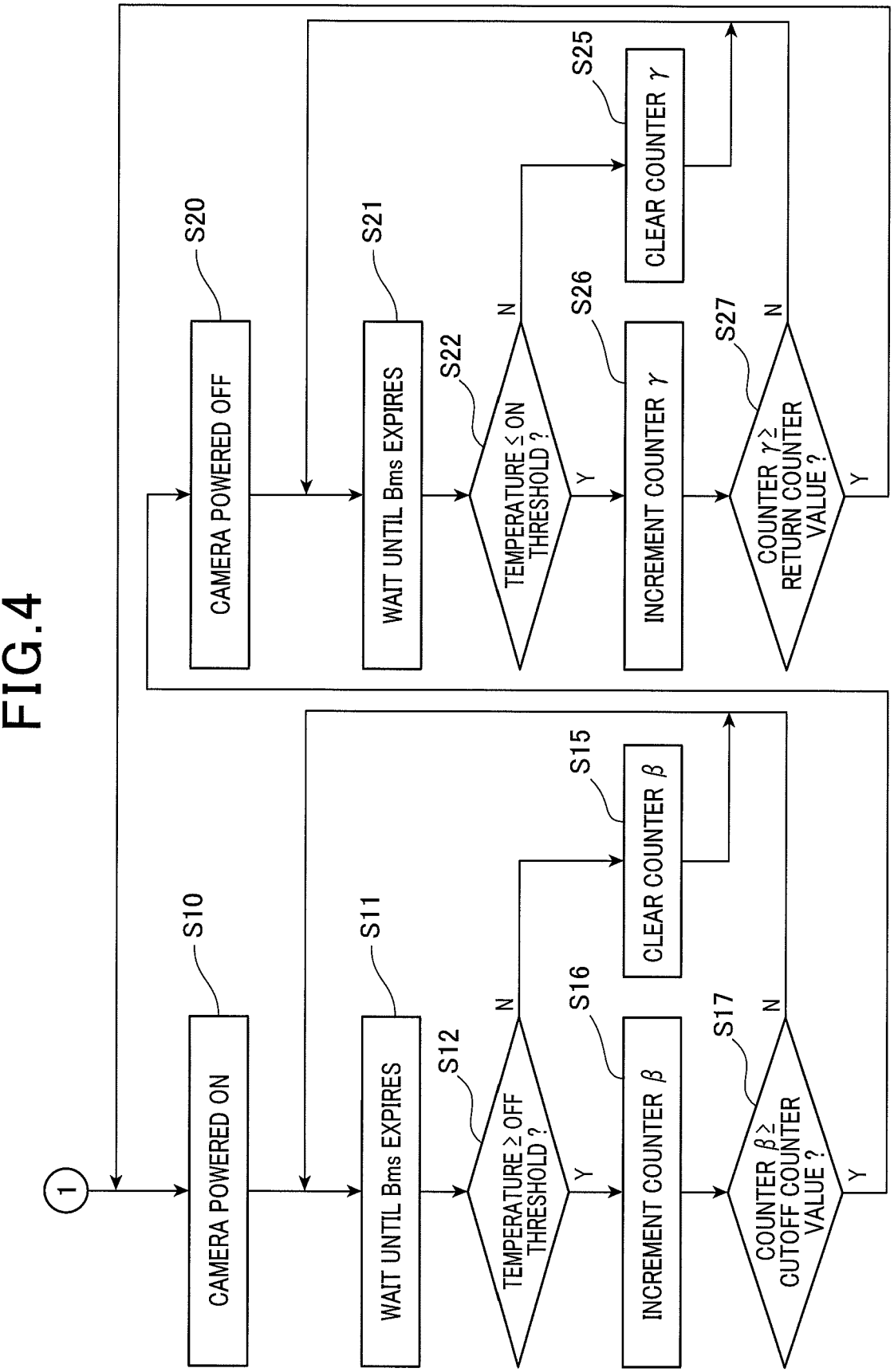
FIG. 4 is a flow chart illustrating continuation of the control.

FIGS. 3 and 4 are flow charts showing a process performed by the image processing/system control section 15 to output a control signal to the B power source 19 and control the state of current supply from the B power source 19 to the imaging element 11. This process is started when the ignition switch of the vehicle is turned on for the start of current supply from the A power source 17 to the image processing/system control section 15 and for the activation of the image processing/system control section 15 ("Start up microcomputer" in FIG. 3).

As shown in FIG. 3, upon start of the process, current supply from the B power source 19 to the imaging element 11 is stopped (camera is powered OFF), first, at S1 (S indicates step: the same applies to the description given below). Therefore, at least immediately after the ignition is turned on, there is no current supply from the B power source 19 to the imaging element 11. At the subsequent S2, the image processing/system control section 15 waits until a predetermined period Ams expires and then the process proceeds to S3. At S3, the image processing/system control section 15 refers to a temperature measured by the temperature measurement section 13 (hereinafter referred to as measured temperature) to determine whether or not the measured temperature is equal to or less than an ON threshold. It should be noted that the ON threshold (corresponding to the "first threshold") corresponds to a temperature at which the current supply is allowed from the B power source 19 to the imaging element 11 (camera is powered ON) if the measured temperature is not more than the temperature.

If the measured temperature is not more than the ON threshold (Y at S3), the process proceeds to S4 where a counter α provided in a storage area of the image processing/system control section 15 is incremented by 1 and the process proceeds to S5. At S5, it is determined whether or not the value of the counter α has become equal to or more than a preset startup counter value. The counter α has been cleared to 0 at the time of starting the control. When the process initially proceeds to S5, a negative determination is made and the process returns to S2 described above. Further, if the measured temperature is determined to exceed the ON threshold at S3 described above (N at S3), the counter α is cleared at S7 and the process returns to S2 described above.

Thus, when a state where the measured temperature is the ON threshold or less (Y at S3) has continued for a predetermined duration as expressed by Ams×(startup counter value), an affirmative determination is made at S5 and the process proceeds to S10. At S10, current supply from the B power source 19 to the imaging element 11 is started (camera is powered ON). At the subsequent S11, the image processing/system control section 15 waits until a predetermined period Bms expires and then the process proceeds to S12. At S12, the image processing/system control section 15 refers to a measured temperature to determine whether or not the measured temperature is an OFF threshold or more. It should be noted that the OFF threshold (corresponding to the "second threshold") corresponds to a temperature at which the current supply from the B power source 19 to the imaging element 11 is stopped (camera is powered OFF) if the measured temperature is the temperature or more. The predetermined periods Ams and Bms as reference intervals for a measured temperature may be the same or may be different from one another as discussed later, but the OFF threshold is set to a temperature higher than the ON threshold.

If the measured temperature is determined to be not more than the ON threshold that is lower than the OFF threshold (Y at S3), followed by the process's proceeding to S12, the measured temperature, in many cases, is less than the OFF threshold (N at S12). Therefore, the process proceeds to S15. At S15, a counter β provided to the storage area of the image processing/system control section 15 is cleared and the process returns to S11 described above.

Then, when the measured value becomes equal to or more than the OFF threshold in the course of the loop processing of from S11 to S15 (Y at S12), the process proceeds to S16 where the counter β is incremented by 1 and the process proceeds to S17. At S17, it is determined whether or not the value of the counter β has become equal to or more than a preset cutoff counter value. When the process initially proceeds to S17, the counter β has usually been cleared to be zero at S15. Accordingly, a negative determination is made at S17 and then the process returns to S11 described above. When the state where the measured temperature is not less than the OFF threshold (Y at S12) continues for a predetermined duration as expressed by Bms×(cutoff counter value), an affirmative determination is made at S17 and the process proceeds to S20. At S20, current supply from the B power source 19 to the imaging element 11 is stopped (camera is powered OFF). At the subsequent S21, the image processing/system control section 15 waits until the predetermined period Bms expires and then the process proceeds to S22. At S22, it is determined whether or not the measured temperature is not more than the ON threshold.

If the measured temperature is determined to be not less than the OFF threshold that is higher than the ON threshold (Y at S12), followed by the process's proceeding to S22, the measured temperature, in many cases, is more than the ON threshold (N at S22). Accordingly, the process proceeds to S25. At S25, a counter γ provided in the storage area of the image processing/system control section 15 is cleared and the process returns to S21 described above.

Then, when the measured temperature becomes not more than the ON threshold in the course of the loop processing of from S21 to S25 (Y at S22), the process proceeds to S26. At S26, the counter γ is incremented by 1 and then the process proceeds to S27. At S27, it is determined whether or not the value of the counter γ has become equal to or more than a preset return counter value. When the process initially proceeds to S27, the counter γ has usually been cleared to 0 at S25. Accordingly, a negative determination is made at S27 and the process returns to S21 described above. Then, when the state where the measured temperature is not more than the ON threshold (Y at S22) continues for a predetermined duration as expressed by Bms×(return counter value), an affirmative determination is made at S27 and the process returns to S10 described above. In this way, current supply from the B power source 19 to the imaging element 11 is restarted.

Advantageous Effects of the Embodiment and its Modifications

When the startup counter value is M, the cutoff counter value is L and the return counter value is N, parameters used in the foregoing control are expressed as shown in FIG. 5. It should be noted that, in FIG. 5, the ON threshold is expressed by K as a digital value which falls within a range of T1° C. (minimum value) to T3° C. (maximum value) in terms of a value before A/D conversion. However, there is no problem if this value is regarded to be a typical T2° C. Similarly, in FIG. 5, the OFF threshold is expressed by J as a digital value which falls within a range of T4° C. to T6° C. in terms of a value before A/D conversion. However, there is no problem if this value is regarded to be a typical T5° C. It should also be noted that T2<T5 is satisfied as described above and accordingly K<J is satisfied.

Accordingly, current supply to the imaging element 11 is in a state of being stopped at the start of the control in the image processing/system control section 15 (S1). When a state where an A/D conversion value of a measured temperature is not more than K has continued for A×M (ms) (Y at S5), current supply to the imaging element 11 is performed (S10). After the start of current supply, when a state where the A/D conversion value of the measured temperature is not less than J has continued for B×L (ms) (Y at S17), the current supply to the imaging element 11 is stopped (S20). After the stop of current supply, when a state where the A/D conversion value of the measured temperature is not more than K has continued for B×N (ms) (Y at S27), current supply to the imaging element 11 is restarted (S10).

In this way, in the present embodiment, current supply to the imaging element 11 is in a state of being stopped at the start of the control. When the temperature in the vicinity of the imaging element 11 is high exceeding the ON threshold (an example of the first threshold), current supply to the imaging element 11 is prevented from starting. Accordingly, the imaging element 11 can be successfully protected. Further, the OFF threshold (an example of the second threshold) is set to be higher than the ON threshold. Therefore, in the event that a measured temperature varies in some degree due to disturbance or heat generation of the imaging element 11, current supply to the imaging element 11 can be stably continued. The temperature difference between the ON threshold and the OFF threshold may, for example, be a range of temperature increase which is ascribed to internal heat generation of the imaging element 11. Further, in the present embodiment, the A power source 17 for supplying power to the image processing/system control section 15 is independent of the B power source 19 for supplying power to the imaging element 11. Accordingly, while current supply to the imaging element 11 is stopped, communication can be established between the image processing/system control section 15 and the CPU of a different system to inform the system that the camera unit 10 is unusable.

As described above, the predetermined periods A and B as the reference intervals for a measured temperature may be equal to one another. However, when A<B is satisfied, the following advantageous effects are exerted. Specifically, a startup period is required to be made shorter than a stop period to increase startup speed. In this case, the startup period corresponds to a period from when the ignition is turned on until when current supply to the imaging element 11 is started, while the stop period corresponds to a period from when the imaging element 11 has reached a high temperature for the stop of current supply until when the subsequent current supply is started. When A=B and M<N are satisfied, the startup period (=A×M) can be made shorter than the stop period (=B×N). However, if the startup counter value (M) is made small, the reliability of the control may be impaired.

On the other hand, when A<B is satisfied, the startup period (=A×M) can be made shorter than the stop period (=B×N) if M=N is satisfied, i.e. if the startup counter value is equal to the return counter value. Further, at the time of starting up the system, a process such as of image analysis has not yet been performed with respect to the results of image pickup performed by the imaging element 11. Accordingly, the processing load of the image processing/system control section 15 is small. Therefore, there is no problem in processing load if the reference intervals are made shorter. Thus, the relation A<B neither increases the processing load of the image processing/system control section 15, nor impairs the reliability of the processing, but can shorten time taken for the startup of the system that makes use of the imaging element 11.

In the foregoing embodiment, the camera unit 10 corresponds to the in-vehicle camera, the temperature measurement section 13 corresponds to the temperature measurement device, and the image processing/system control section 15 corresponds to the current supply control device. Further, the present invention should not be construed as being limited to the foregoing embodiment, but may be implemented in various modes within a scope not departing from the spirit of the present invention. For example, the present invention may also be applied to various in-vehicle cameras, such as an in-vehicle camera for rearward monitoring. However, when the present invention is applied to an in-vehicle camera arranged around the front window 3 as in the foregoing embodiment, the effect is more prominently exhibited because the temperature tends to be high around the front window 3.

What is claimed is:

1. An in-vehicle camera control device for an in-vehicle camera including a housing and an imaging element to pick up an image around a vehicle, the in-vehicle camera control device controlling at least a state of current supply to the imaging element, wherein the in-vehicle camera control device comprises:
a first power supply portion configured to supply electrical current to the imaging element;
an image processing system control disposed in the housing and controlling the first power supply portion;

a second power supply portion, which is different from the first power supply portion, configured to supply electrical current to the image processing system control; and a temperature measurement device that is disposed in the housing and configured to measure a temperature in the vicinity of the imaging element;

wherein:

the housing is mounted to a windshield of the vehicle and disposed inside the vehicle; and the image processing system control, energized by the second power supply portion, is configured to:
 (a) detect the temperature measured by the temperature measurement device prior to the first power supply portion starting current supply to the imaging element;
 (b) start the current supply from the first power supply portion to the imaging element when the detected temperature detected by the temperature measurement device is not more than a preset first threshold; and
 (c) stop the current supply from the first power supply portion to the imaging element, when the detected temperature detected by the temperature measurement device is more than a preset second threshold, the preset second threshold being larger than the preset first threshold; and the second power supply portion is disposed in the housing.

2. The in-vehicle camera control device according to claim 1, wherein, when an interval for the image processing system control to refer to the temperature measured by the temperature measurement device is a reference interval, a period from when the image processing system control starts control until when the current supply to the imaging element is started is a startup period, and a period from when the image processing system control stops the current supply to the imaging element until when the current supply to the imaging element is restarted is a stop period, the reference interval in the startup period is shorter than the reference interval in the stop period.

3. The in-vehicle camera control device according to claim 1, wherein:
 the image processing system control is configured to maintain stopping of the current supply to the imaging element unless a state that a predetermined period has elapsed while the temperature measured by the temperature measurement device is not more than the preset first threshold.

4. The in-vehicle camera control device according to claim 1, wherein the image processing system control is further configured to wait until a predetermined period expires after an ignition switch of the vehicle is turned on and to start the current supply to the imaging element only when the temperature is not more than the preset first threshold and the predetermined period is expired.

5. An in-vehicle camera control device for an in-vehicle camera including a housing and an imaging element to pick up an image around a vehicle, the in-vehicle camera control device controlling at least a state of current supply to the imaging element, wherein the in-vehicle camera control device comprises:

a first power supply portion configured to supply electrical current to the imaging element;

an image processing system control disposed in the housing and controlling the first power supply portion;

a second power supply portion, which is different from the first power supply portion, configured to supply electrical current to the image processing system control; and a temperature measurement device that is disposed in the housing and configured to measure a temperature in the vicinity of the imaging element;

wherein:

the housing is mounted to a windshield of the vehicle and disposed inside the vehicle; and the image processing system control, energized by the second power supply portion, is configured to:
 (a) detect the temperature measured by the temperature measurement device prior to the first power supply portion starting current supply to the imaging element;
 (b) wait until a predetermined period expires after and in response to an ignition switch of the vehicle being turned on;
 (c) refer to the temperature measured by the temperature measurement device prior to the starting of the current supply from the first power supply portion to the imaging element;
 (d) start the current supply from the first power supply portion to the imaging element when the detected temperature detected by the temperature measurement device is not more than a preset first threshold and the predetermined period is expired; and
 (e) stop the current supply from the first power supply portion to the imaging element, when the detected temperature detected by the temperature measurement device is more than a preset second threshold, the preset second threshold being larger than the preset first threshold; and the second power supply portion is disposed in the housing.

* * * * *